Sept. 7, 1926.

S. HANSEN

AUTOMOBILE DOOR HANDLE

Filed Nov. 12, 1924

1,598,609

Inventor
Sven Hansen
By Brockett, Hyde & Milburn
Attorneys

Patented Sept. 7, 1926.

1,598,609

UNITED STATES PATENT OFFICE.

SVEN HANSEN, OF CLEVELAND, OHIO.

AUTOMOBILE DOOR HANDLE.

Application filed November 12, 1924. Serial No. 749,463.

The present invention relates to an improved extension handle for use on automobile doors.

As is well known, in certain automobiles of the comparatively lower priced grade, the door handles are located on the inside, and when the curtains are on the car, there is caused considerable confusion in finding and operating the handle when it is desired to open the door from the outside, this being due to the fact that the curtains conceal the handle from view. It is therefore the object of the present invention to provide an extension handle which might be readily applied to the ordinary handle on the inside of the door of certain types of automobiles, so as to facilitate operation of the same for opening the door when such handle would otherwise be comparatively inaccessible because of the automobile curtains.

Specifically, the present invention comprises an extension handle with a one end portion which can be readily secured to the handle on the inside of the door of the automobile and which extends across the top edge of the door to the outside of the same so as to permit the door to be opened from the outside and without having to insert the hand through the curtains to reach the handle on the inside of the door.

It is to be understood that the present invention is not limited to the particular form or design of the handle extension here shown, as the form of the same may be varied from the present illustration without departing from the spirit of the invention.

Figure 1:
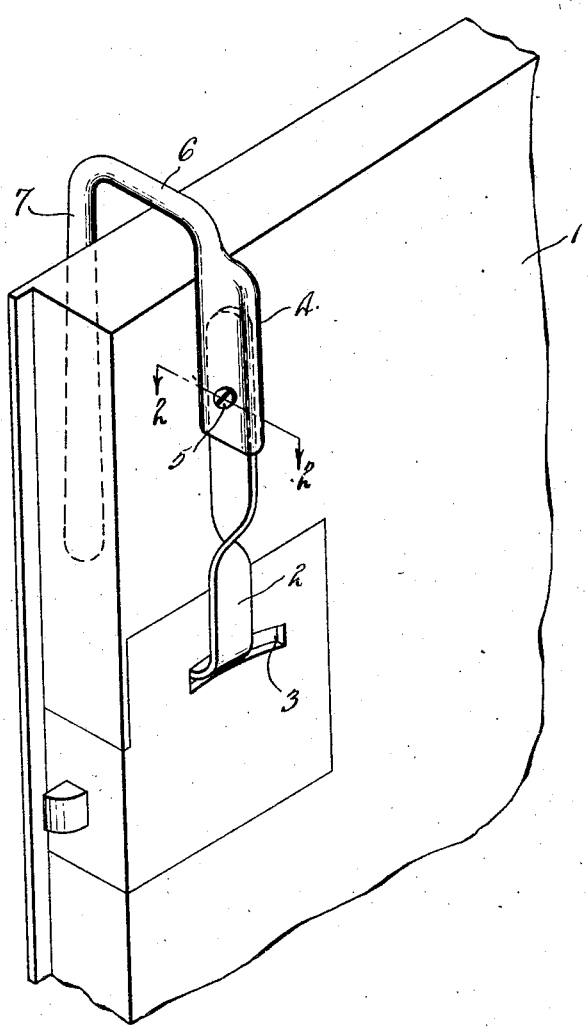
Figure 2:
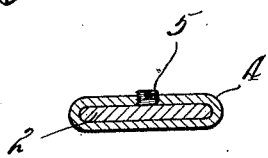

Fig. 1 is a perspective view showing my improved device applied to an automobile door handle; Fig. 2 is a sectional view taken on line 2—2 of Fig. 1.

According to the present illustration, reference numeral 1 shows the type of automobile door with the handle 2 ordinarily operatable from the inside of the door, the ordinary door handle extending and terminating on the inside of the door. It is understood of course that this type of handle is operated backwardly and forwardly along the slot 3.

The present improved handle extension comprises the inside socket portion 4 which is of hollow form and of proper shape and design to fit snugly down over the upper portion of the handle 2 and to be secured thereto by means of the set screw 5. From the upper end of the socket portion 4 there extends the substantially horizontal portion 6 which projects outwardly across the top edge of the door 1 and then continues downwardly along the outside of the door so as to provide the outside handle portion 7 which is readily accessible at all times from the outside of the car.

My improved extension handle is of a substantial U-shape and is formed as a single, integral unitary attachment which may be readily attached to the door handle and which requires no other point of attachment except to the door handle itself.

It will be readily understood that with this particular improved extension handle there will be no longer experienced the difficulty of finding and operating the ordinary handle 2 on the outside of the door when the automobile curtains are on the car. Without such a handle extension it is practically impossible for one who is not thoroughly familiar with the particular car to know or determine just where the door handle is located and there is therefore, occasion for considerable confusion in attempting to open the door by projecting the hand between the lower edge of the curtain and the top edge of the door. With the present improved device, there will be realized the same advantage as possessed by the other type of door handle which is located on the outside of the door, as is familiar in certain higher grade cars. In other words, the present invention serves to give certain types of lower priced cars the same advantage in this respect as is possessed by certain other higher priced cars.

It is to be understood that my improved extension handle which is of a single unitary form may be made of any suitable material, and, because of its simplicity can be made and sold at a comparatively low cost.

What I claim is:

An extension handle for automobile doors, comprising a substantially U-shaped unitary accessory having means for attachment to an abbreviated handle on the one side of a door and to extend freely around the edge of the door to the other side thereof so as to be readily accessible at all times from said other side.

In testimony whereof I hereby affix my signature.

SVEN HANSEN.